(12) United States Patent
Bae et al.

(10) Patent No.: US 9,858,519 B2
(45) Date of Patent: Jan. 2, 2018

(54) MULTI-MAGNETIC CARD AND METHOD FOR MANUFACTURING MAGNETIC CELL

(71) Applicant: Brilliantts Co., Ltd., Seongnam-si (KR)

(72) Inventors: Jae Hun Bae, Seongnam-si (KR); Jae Ho Bae, Daejeon (KR); Byung Chul Jung, Seoul (KR)

(73) Assignee: Brilliantts Co., Ltd., Seongnam-si (KR)

( * ) Notice: Subject to any disclaimer, the term of this patent is extended or adjusted under 35 U.S.C. 154(b) by 0 days.

(21) Appl. No.: 15/326,416

(22) PCT Filed: Jul. 14, 2015

(86) PCT No.: PCT/KR2015/007273
§ 371 (c)(1),
(2) Date: Jan. 13, 2017

(87) PCT Pub. No.: WO2016/010325
PCT Pub. Date: Jan. 21, 2016

(65) Prior Publication Data
US 2017/0206444 A1 Jul. 20, 2017

(30) Foreign Application Priority Data

Jul. 14, 2014 (KR) .................. 10-2014-0088649
Apr. 30, 2015 (KR) .................. 10-2015-0061872
May 6, 2015 (KR) .................. 10-2015-0063041

(51) Int. Cl.
*G06K 7/08* (2006.01)
*G06K 19/06* (2006.01)
*G06K 19/07* (2006.01)

(52) U.S. Cl.
CPC ... *G06K 19/06187* (2013.01); *G06K 19/0723* (2013.01)

(58) Field of Classification Search
CPC .......... G06K 7/084; G06K 7/087; G07D 7/04
(Continued)

(56) References Cited

U.S. PATENT DOCUMENTS 5,857,079 A 1/1999 Claus et al.
7,594,611 B1 9/2009 Arrington
(Continued)

FOREIGN PATENT DOCUMENTS

EP 0650142 10/2002
EP 2172952 4/2010
(Continued)

OTHER PUBLICATIONS

International Search Report dated Sep. 25, 2015, in International Application No. PCT/KR2015/007273.
(Continued)

*Primary Examiner* — Ahshik Kim
(74) *Attorney, Agent, or Firm* — H.C. Park & Associates, PLC

(57) ABSTRACT

A smart card may include: a support; and a magnetic field generator arranged on the support and including at least one track configured to generate a magnetic signal corresponding to a card information stored on the smart card by forming a magnetic field, wherein the at least one track may include a single magnetic cell in which both magnetic poles thereof are formed when an electric current flows therethrough, wherein the magnetic cell may include: a first layer having a first circuit pattern and a first via hole; a second layer having a second circuit pattern and a second via hole; and a core material provided between the first layer and the second layer, and wherein the first and second via holes are matched so that the electric current rotationally flows through the circuit patterns and the via holes in a predetermined direction with respect to the core material.

16 Claims, 10 Drawing Sheets

(58) Field of Classification Search
USPC .......................................................... 235/449
See application file for complete search history.

(56) References Cited

U.S. PATENT DOCUMENTS

| | | | |
|---|---|---|---|
| 8,317,103 B1 * | 11/2012 | Foo | G06K 19/06187 |
| | | | 235/449 |
| 8,727,219 B1 | 5/2014 | Mullen | |
| 9,704,088 B2 * | 7/2017 | Mullen | G06K 19/07709 |
| 2002/0175207 A1 | 11/2002 | Kashef et al. | |
| 2004/0010462 A1 | 1/2004 | Moon et al. | |
| 2006/0151614 A1 | 7/2006 | Nishizawa et al. | |
| 2008/0065535 A1 | 3/2008 | Gangi | |
| 2008/0201265 A1 | 8/2008 | Hewton | |
| 2009/0261161 A1 | 10/2009 | Blossom | |
| 2009/0261166 A1 | 10/2009 | Lawson et al. | |
| 2010/0096465 A1 | 4/2010 | Stagg | |
| 2011/0016025 A1 | 1/2011 | Gaisford | |
| 2011/0028184 A1 | 2/2011 | Cooper | |
| 2011/0295748 A1 | 12/2011 | Woodriffe | |
| 2012/0024945 A1 | 2/2012 | Jones | |
| 2012/0085826 A1 | 4/2012 | Talker | |
| 2012/0168500 A1 | 7/2012 | Li | |
| 2013/0048712 A1 | 2/2013 | Guillaud et al. | |
| 2013/0134216 A1 | 5/2013 | Spodak et al. | |
| 2013/0248594 A1 | 9/2013 | Soom | |
| 2014/0040128 A1 | 2/2014 | Park | |
| 2014/0059496 A1 | 2/2014 | White et al. | |
| 2014/0084059 A1 | 3/2014 | Sierchio et al. | |
| 2014/0289671 A1 | 9/2014 | Ohmori et al. | |

FOREIGN PATENT DOCUMENTS

| | | |
|---|---|---|
| KR | 10-2010-0013668 | 2/2010 |
| KR | 10-2014-0065114 | 5/2014 |
| WO | 2005091212 | 9/2005 |
| WO | 2013/028930 | 2/2013 |

OTHER PUBLICATIONS

International Search Report dated Oct. 19, 2015, in international Application No. PCT/KR2015/007276.
International Search Report dated Oct. 19, 2015 for international Application No. PCT/KR2015/007264.
Non Final Office Action dated Sep. 22, 2017, issued in U.S. Appl. No. 15/326,426.
Non Final Office Action dated Sep. 8, 2017, issued in U.S. Appl. No. 15/326,367.
The Extended European Search report dated Sep. 20, 2017 in European Application No. 15821326.4.
The Extended European Search report dated Jul. 19, 2017 in European Application No. 15861451.1.

* cited by examiner

MULTI-MAGNETIC CARD AND METHOD FOR MANUFACTURING MAGNETIC CELL

CROSS-REFERENCE TO RELATED APPLICATION[S]

This application is the National Stage Entry of International Patent Application No. PCT/KR2015/007273, filed on Jul. 14, 2015, and claims priority from and the benefit of Korean Patent Application No. 10-2014-0088649, filed Jul. 14, 2014, Korean Patent Application No. 10-2015-0061872, filed Apr. 30, 2015, and Korean Patent Application No. 10-2015-0063041, filed May 6, 2015, which are hereby incorporated by reference for all purposes as if fully set forth herein.

BACKGROUND

Field

The invention relates generally to a multi-magnetic smart card, and more particularly, to a multi-magnetic smart card including a magnetic field generator configured to generate a magnetic signal corresponding to card information of a selected one of plurality of cards stored on the multi-magnetic smart card and a method for manufacturing a magnetic cell for use in such a card.

Discussion of the Background

As modern society has rapidly become information-based and credit-based after industrialization, the use of credit cards, which are referred to as "plastic money," has increased to be as prevalent as cash. Accordingly, the number of credit cards carried by a regular adult has also significantly increased, and thus each person uses at least two or three cards, and in some cases, ten or more cards are held and used. Also, various rewards cards have been issued and are used as an essential marketing tool in most business to consumer (B2C)-based corporations, and are widely used to promote sales at small stores or shopping centers.

Accordingly, a large number of credit cards and reward cards are being issued and many are unnecessary and/or discarded, thereby generating unnecessary issuing costs and social costs. Furthermore, the reward cards or discount cards issued from individual stores may be utilized only when the consumer possesses such cards during their visits. This causes consumers to avoid use of these cards due to inconvenient and complex card management and causes generation of unnecessary marketing costs to businesses.

For example, credit cards are generally considered to have better utilization than rewards cards. The average number of credit cards issued to each consumer increased to 4 in 2001, stopped increasing for a while after the credit card liquidity crisis, and then continued to increase to 4.9 in 2011. The total number of credit cards that has been issued reached approximately 122,130,000 in 2011.

However, the average number of cards that are actually used by each consumer is only 1.4 despite the increasing number of issued cards. As a result, most credit cards issued to each consumer become dormant, and about 20,000,000 or more cards (corresponding to about 40,000,000,000 Korean won or more) are being discarded. Considering that the above figure included various cash replacement cards including debit cards, check cards, cash cards, and prepaid cards or marketing cards such as rewards cards or discount cards, astronomical costs are being wasted on dormant or discarded cards.

Accordingly, there is a need to develop a card that integrates various cards such as debit cards, check cards, credit cards, and membership cards.

SUMMARY

A multi-magnetic smart card constructed according to the principles of the invention can solve one or more of the above problems by providing a multi-magnetic smart card that may be used like a regular card. The multi-magnetic smart card has a magnetic strip with specific card information selectable from several cards corresponding to different card information stored in a single card to improve the user convenience by reducing the number of cards carried by a user.

A multi-magnetic smart card constructed according to the principles of the invention may have a magnetic cell including core material made of a mixture of magnetic powder and adhesive material, which may provide adhesive strength to attach respective layers, thereby improving manufacturing efficiency and reducing manufacturing cost.

According to a first aspect of the invention, a smart card may include: a support; and a magnetic field generator arranged on the support and including at least one track configured to generate a magnetic signal corresponding to a selected one of multiple card information stored on the smart card by forming a magnetic field, wherein the at least one track may include a single magnetic cell in which both magnetic poles thereof are formed when an electric current flows therethrough, wherein the magnetic cell may include: a first layer having a first circuit pattern and a first via hole; a second layer having a second circuit pattern and a second via hole; and a core material provided between the first layer and the second layer, and wherein the first via hole and the second via hole are matched so that the electric current rotationally flows through the circuit patterns and the via holes in a predetermined direction with respect to the core material.

The core material may be a mixture including: a magnetic powder; and an adhesive material to have adhesive strength.

The magnetic cell may be formed by attaching one or more pieces of the core material cut to a predetermined length to a predetermined position of the first layer and then attaching the second layer therewith.

The magnetic cell may further include an internal space formed between the first layer and the second layer, and the core material may be injected into the internal space.

The core material may be printed on one of the first layer or the second layer in a specific shape.

The smart card may further include: a magnetic field blocking layer disposed in the output direction of the magnetic signal of the magnetic cell, the magnetic field blocking layer configured to block the magnetic field from leaking to the outside.

The smart card may further include: an insertion detecting unit configured to recognize an insertion of the smart card into a card reader.

The insertion detecting unit may be disposed on the support so that it comes into contact with a header of the card reader when the smart card is inserted therein.

The smart card may further include: a shielding layer configured to prevent interference between the tracks when the magnetic field generator may include a plurality of tracks.

The smart card may further include a processor provided in the support and configured to transmit a magnetic driving current signal corresponding to specific card information to the magnetic field generator.

The magnetic signal may be time series data generated over time by controlling whether the magnetic driving current signal is supplied or by controlling a flow direction of the magnetic driving current signal.

According to a second aspect of the invention, a method of manufacturing a magnetic cell may include: attaching a core material including a mixture of magnetic powder and adhesive material to a predetermined position of a first layer having a first circuit pattern; and attaching a second layer having a second circuit pattern with a predetermined position at which the first circuit pattern will be connected to the second circuit pattern, wherein the first circuit pattern may be connected to the second circuit pattern so that an electric current rotationally flows in a specific rotational direction with respect to the core material.

According to a third aspect of the invention, a method of manufacturing a magnetic cell may include: attaching a first layer having a first circuit pattern and a second layer having a second circuit pattern to connect the first circuit pattern to the second circuit pattern; and injecting a core material including a mixture of magnetic powder and adhesive material into an internal space formed between the first layer and the second layer, wherein at least one of the first layer and the second layer may include a curved area that forms the internal space when the first layer and the second layer are attached, and wherein the first circuit pattern may be connected to the second circuit pattern so that an electric current rotationally flows in a specific rotational direction with respect to the core material.

The attaching the core material may include: printing a core material at a predetermined position of a first layer in a specific shape, the first layer having a first circuit pattern.

The support may include a plate.

The processor may include a control unit.

According to the invention, the following various effects can be obtained.

First, the multi-card according to an exemplary embodiment of the invention may improve ease of carrying cards because all data for payment and reward accumulation is stored in a single card. thus, the weight of a wallet carried by a user may be reduced by reducing the number of cards carried by the user.

Second, the multi-card according to an exemplary embodiment of the invention may implement desired card information through the magnetic field generator by directly swiping the multi-card or by inserting the multi-card. Thus, payment may be performed in an appropriate method depending on the case.

Third, the multi-card may display card information through the information display unit, thus allowing the user to check which card is selected for payment.

Fourth, the multi-card according to an exemplary embodiment of the invention may include the information input unit so that the user may readily manipulate a card. In particular, the information input unit and the information display unit may be a touchscreen, and the touchscreen provides improved convenience in that the card manipulation can be immediately performed while the display unit is being checked, and the multi-card may have reduced thickness because separate input elements such as a keypad is not necessary.

Fifth, manufacturing a magnetic cell may be simplified compared to conventional methods by attaching or injecting a core material between a first layer and a second layer, thereby providing the advantage of increasing production efficiency.

Sixth, material costs for generating a core layer can be reduced by inserting the core material into an internal space formed between the first layer and the second layer, rather than forming a separate layer for the core layer.

Seventh, the multi-card according to an exemplary embodiment of the invention may prevent or reduce interference between tracks by using the shielding layer, thus increasing a recognition rate when the card is used.

DETAILED DESCRIPTION OF THE ILLUSTRATED EMBODIMENTS

Figure 1:
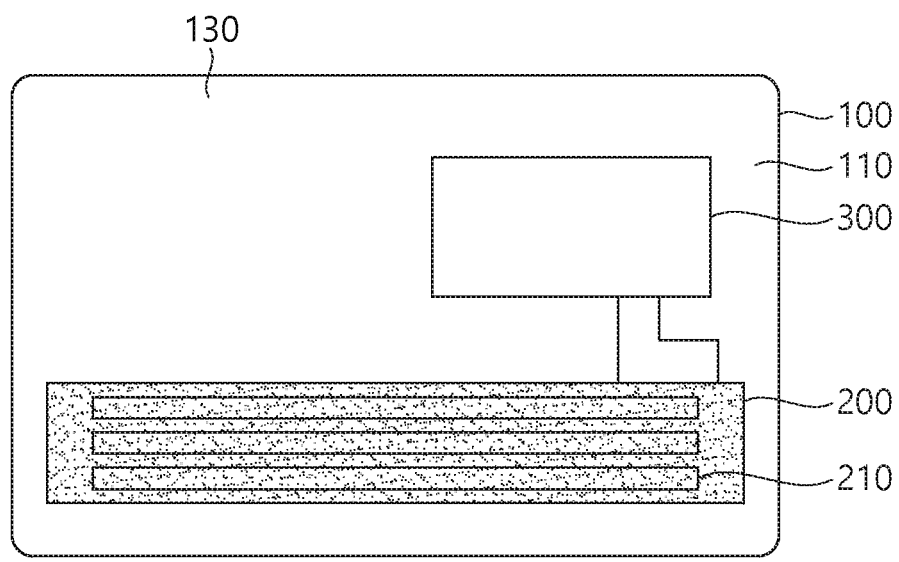
FIG. 1 is a bottom plan view of an exemplary embodiment of a multi-card constructed according to the principles of the invention.

Preferred exemplary embodiments of the invention will be described below in detail with reference to the accompanying drawings. Advantages and features of the invention is and methods of accomplishing the same will be apparent by referring to exemplary embodiments described below in detail in connection with the accompanying drawings. However, the invention is not limited to the exemplary embodiments disclosed below and may be implemented in various different forms. The exemplary embodiments are provided only for completing the disclosure of the invention and for fully representing the scope of the invention to those skilled in the art. The scope of the invention is defined only by the claims Like reference numerals refer to like elements throughout.

Unless otherwise defined, all terms (including technical and scientific terms) used herein have the same meaning as commonly understood by one of ordinary skill in the art to which this invention belongs. It should be further understood that terms, such as those defined in commonly-used dictionaries, should be interpreted as having a meaning that is consistent with their meaning in the context of the relevant art and are not to be interpreted in an idealized or overly formal sense unless expressly so defined herein.

The terminology used herein is for the purpose of describing particular exemplary embodiments only and is not intended to be limiting of the invention. As used herein, the singular forms "a," "an," and "the" are intended to include the plural forms as well, unless the context clearly indicates otherwise. The terms "comprises" and/or "comprising" used herein specify the presence of stated elements, but do not preclude the presence or addition of one or more other elements.

The multi-magnetic smart card according to exemplary embodiments may include a support such as a plate 100 including a rear surface 110 and a front surface 120, a magnetic field generator 200, a magnetic cell 210, a first layer 211, a second layer 212, an internal space 213, a curved area 214, a circuit pattern 220, a core material 230, a control unit 300, an insertion detecting unit 400, an information display unit 500, an information input unit 600, a magnetic field blocking layer 700, and a shielding layer 800 are shown in FIGS. 1, 2, 3, 4, 5, 6, 7, 8, 9, and 10.

Hereinafter, multi-magnetic smart cards according to exemplary embodiments of the invention will be described with reference to the accompanying drawings.

Figure 2:
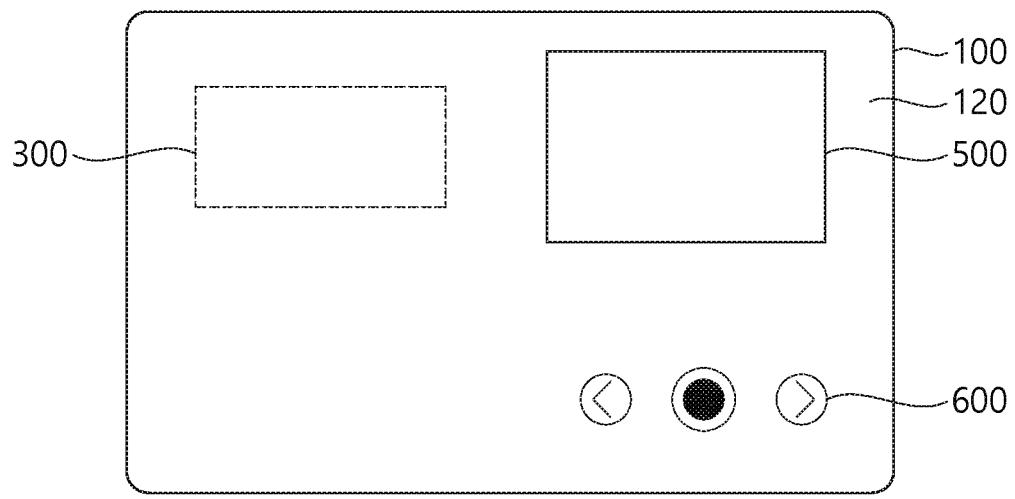
FIG. 2 is a top plan view of a multi-card according to an exemplary embodiment of the invention.
Figure 3:
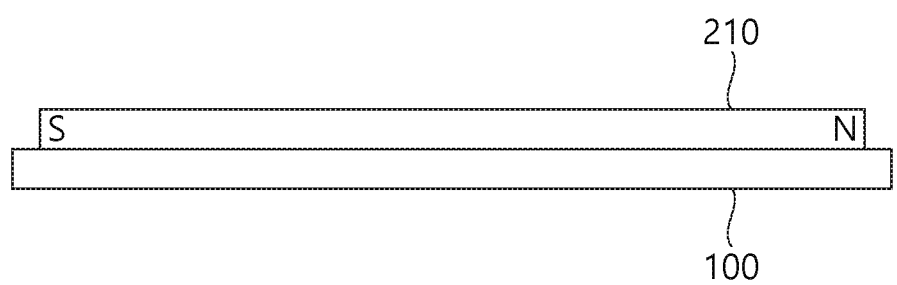
FIG. 3 is a side view of an end of a multi-card according to an exemplary embodiment of the invention.
Figure 4:
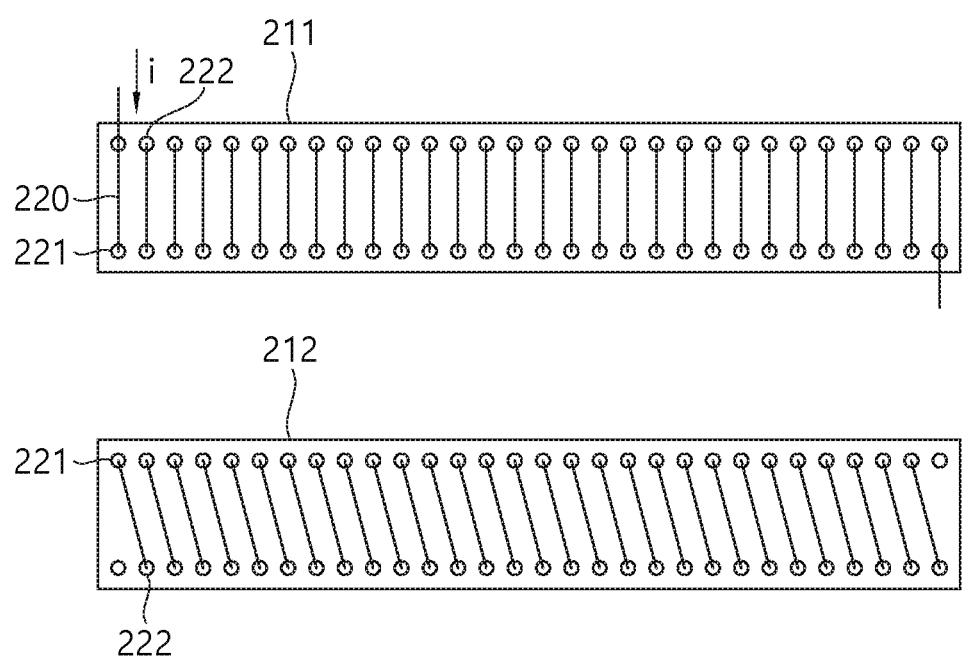
FIG. 4 is a plan view of a first layer and a second layer of a magnetic field generator according to an exemplary embodiment of the invention.
Figure 5:
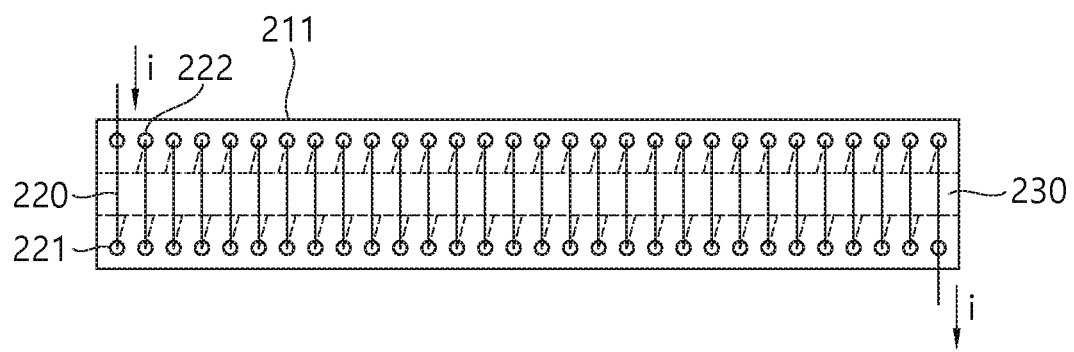
FIG. 5 is a plan view of a magnetic cell formed by a first layer, a second layer, and a core material according to an exemplary embodiment of the invention.
Figure 6:
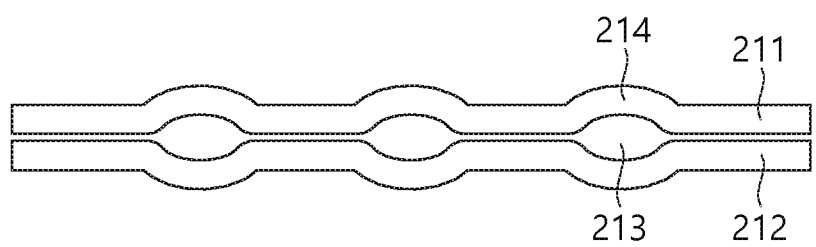
FIG. 6 is a side view of a magnetic field generator into which a core material may be injected into an internal space formed by attaching a first layer and a second layer according to an exemplary embodiment of the invention.
Figure 7:
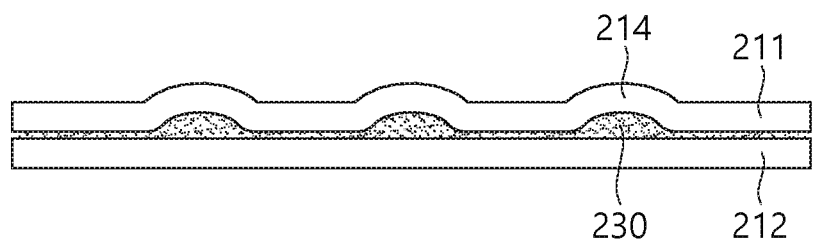
FIG. 7 is a side sectional view of a magnetic field generator in which a core material is disposed on a layer at one side and a layer at the other side is attached thereto according to an exemplary embodiment of the invention.

Referring to FIGS. 1 and 2, a multi-magnetic smart card according to an exemplary embodiment of the invention includes all or some of the plate 100, the magnetic field generator 200, the control unit 300, the insertion detecting unit 400, the information display unit 500, the information input unit 600, the magnetic field blocking layer 700, and the shielding layer 800.

The plate 100 may be formed as a rectangular board, and edge portions of the rectangular board may be formed to be round. The plate 100 may include elements, such as the magnetic field generator 200 and the control unit 300, of the multi-card. The plate 100 may be formed as a metal plate or a plastic plate made of flexible material like a general card and may also be formed by stacking several plates.

In the plate 100, the magnetic field generator 200 having a band shape may be disposed at one side of the rear surface 110, and more particularly, at one side of the rear surface 110 adjacent to any one of two long sides of the plate 100 formed as a rectangle, and may be exposed to the outside. Also, in the plate 100, the insertion detecting unit 400 to be described below may be provided in a direction extending from one end of the magnetic field generator 200 (e.g., a direction in which the plate 100 is inserted into a card reader), and may be exposed to the outside. Also, the information display unit 500 and the information input unit 600 to be described below may be provided at one side of the front surface 120 of the plate 100, and may be exposed to the outside.

Some elements that are exposed to the outside, such as the magnetic field generator 200, the insertion detecting unit 400, the information display unit 500, and the information input unit 600, and elements that are not exposed to the outside, such as the control unit 300, electrical wirings (not shown), a memory (not shown), and a power supply unit (not shown), may be built into the plate 100. When a plurality of plates 100 are formed, the electrical wirings may be formed between the plurality of plates 100, and the plurality of plates 100 may be connected through via holes corresponding to wiring paths.

The magnetic field generator 200 is configured to generate a magnetic signal corresponding to card information by forming a magnetic field. The magnetic field generator 200 is disposed adjacent to a side of the rear surface 110 of the plate 100, more particularly, to one of two long sides of the magnetic field generator 300, and exposed to the rear surface 110 of the plate 100. Thus, when the plate 100 passes by a card reader, the magnetic field generator 200 may be adjacent to a header of the card reader.

The magnetic field generator 200 includes at least one track. The track includes a single magnetic cell 210 in which both poles formed when an electric current is input thereto are exposed in an output direction of the magnetic signal. That is, the single magnetic cell 210 may be disposed in a length direction of the entire track so that both poles (that is, the N pole and S pole) generated when power is input thereto are exposed to the outside.

The magnetic cell 210 includes the first layer 211, the second layer 212, and the core material 230.

The first layer 211 may have a first circuit pattern 220 at one side thereof. The first circuit pattern 220 may be directly disposed or printed on the one side of the first layer 211, and the circuit pattern 220 may be provided inside the first layer 211. Also, referring to FIG. 4, the circuit pattern 220 may be disposed in the first layer 211 parallel in a certain direction.

The second layer 212 may have a second circuit pattern 220 at one side thereof. The second circuit pattern 220 may be directly printed on the one side of the second layer 212, and the circuit pattern 220 may be provided inside the second layer 212. Also, like the first layer 211, the circuit pattern 220 may be disposed in the second layer 212 parallel in a certain direction. The wirings in the first circuit pattern and the second circuit pattern may be sequentially connected so that an electric current continuously and rotationally flows in a specific direction when the first layer 211 and the second layer 212 are attached. For example, referring to FIG. 5, an electric current input through the first circuit pattern 220 of the first layer 211 may flow to the second circuit pattern of the second layer 212 through a node 221 at which the first circuit pattern and the second circuit pattern meet. Subsequently, the electric current flows through the second circuit pattern and flows to the first circuit pattern at a node 222 at which the first circuit pattern and the second circuit pattern meet. Through repetition of such an electric current flow, electric current may rotationally flow with respect to the core material disposed between the first layer 211 and the second layer 212.

Also, the first layer 211 and the second layer 212 may further include via holes (a first via hole and a second via hole). Each of the via holes may connect the first circuit pattern of the first layer 211 and the second circuit pattern of the second layer 212 when the first circuit pattern and the second circuit pattern are provided on a surface corresponding to an outer surface when the first layer 211 and the second layer 212 are attached. That is, while the first circuit pattern and the second circuit pattern are not directly connected due to a thickness of the first layer 211 or the second layer 212, the first circuit pattern and the second circuit pattern may be connected through the first via hole and the second via hole. The first via hole and the second via hole may be disposed at corresponding positions, and thus may be connected when the first layer 211 and the second layer 212 are attached. Accordingly, the first via hole and the second via hole are directly matched, and the electric current rotationally flows in a specific direction with respect to the core material through the circuit patterns and the via holes.

The core material 230 may be provided in a space between the first layer 211 and the second layer 212 and configured to strengthen a magnetic field. That is, the core material 230 includes a magnetic material and may strengthen a magnetic field formed by the electric current that continuously flows through the first circuit pattern and the second circuit pattern. In particular, the core material 230 may be formed by mixing a magnetic powder and an adhesive material to have adhesive strength. That is, the magnetic cell 210 may be formed by attaching, injecting, or inserting the core material made by mixing an adhesive material with magnetic powder into a space between the first layer 211 and the second layer 212. The core material may have various viscosities depending on the type of adhesive material mixed with a ferromagnetic material or a mixing ratio of the ferromagnetic material and the adhesive material. For example, when the magnetic field generator 200 is generated by injecting the core material 230 into a specific internal space, the core material 230 formed by mixing magnetic powder with an adhesive material having low viscosity may be used. Also, for example, when the core material 230 is formed by mixing a magnetic powder and an adhesive material having high viscosity to have double-sided adhesive strength like a sticker, the magnetic cell 210 may be formed by attaching the core material 230 to one surface of the first layer 211 or the second layer 212 and attaching the opposite layer therewith. The adhesive material may include various types of adhesive materials (e.g., a resin) that do not affect generation of a magnetic field. The magnetic powder may include iron, ferrite, nickel, cobalt, manganese, aluminum, platinum, silver, copper, zinc, lead, etc. Also, the magnetic material may be formed of an alloy including the magnetic powder (that is, iron, ferrite, nickel, cobalt, manganese, aluminum, platinum, silver, copper, zinc, lead, etc.).

Various methods may be applied to form the magnetic cell 210 by placing the core material 230 therein. The exemplary embodiments of the invention are not limited to the method of manufacturing the magnetic cell 210 described below.

The magnetic cell 210 may be formed by attaching the first layer 211 and the second layer 212 to form an internal space and injecting the core material 230 into the internal space. For example, referring to FIG. 6, the first layer 211 and the second layer 212 may have respective curved areas 214 and form an internal space by the curved areas 214 being opposed when the first layer 211 and the second layer 212 are attached. The magnetic cell 210 may be formed by injecting the core material 230 to fill the internal space.

Also, the magnetic cell 210 may be formed by directly printing the core material 230 on the first layer 211 or the second layer 212 in a specific form. That is, the magnetic cell 210 may be formed by printing the core material 230 in a specific size on a surface of the first layer 211 or the second layer 212 that is to be attached with the opposite layer and attaching the opposite layer therewith. The first layer 211 or the second layer 212 may have a space on which the core material 230 is to be printed. For example, referring to FIG. 7, one of the first layer 211 or the second layer 212 may have a recessed printing space (or the curved area 214). The magnetic cell 210 may be formed by filling the printing space with the core material 230 and then covering the printing space with a flat opposing layer. Also, for example, when the first layer 211 or the second layer 212 is formed of flexible material, the magnetic cell 210 including the core material 230 between the first layer 211 and the second layer 212 may be generated by bending the first layer 211 or the second layer 212 after printing the core material 230 thereon.

Also, the magnetic cell 210 may be formed by attaching the core material 230 that is cut to a predetermined length to the first layer 211 or the second layer 212. For example, the core material 230 may be capable of double-sided adhesion, and the core material 230 may be cut to a predetermined length to be simply attached to the first or second layer 212. Thus, it is possible to simplify a process of manufacturing the magnetic cell 210 and increasing a speed of the process in comparison to a conventional method.

Also, when the magnetic field generator includes a plurality of tracks, the magnetic cell 210 may be formed by placing a plurality of pieces of the core material 230 (e.g., the core material 230 capable of double-sided adhesion) in parallel to the first layer 211 or the second layer 212 and attaching the opposite layer thereto.

Also, the control unit 300 may be further included. The control unit 300 is provided in the plate 100 and configured to deliver a magnetic driving current signal corresponding to specific card information to the magnetic field generator 200, and may be or include a processor. The control unit 300 may control the magnetic field generator 200 to generate magnetic signals in time series by controlling whether the magnetic driving current signal is supplied or by controlling a flow direction of the magnetic driving current signal. That is, the single magnetic cell 210 may control a direction of a magnetic field applied to a header of a card reader by adjusting an electric current. When the magnetic field generator 200 includes a plurality of tracks, the control unit 300 may control a magnetic driving current signal input to each of the tracks and may change a magnetic field in a header of a card reader corresponding to each track.

The control unit 300 may generate a magnetic signal corresponding to card information such that a magnetic field direction is changed in an electric current direction at predetermined time intervals. A typical magnetic card controls an interval of a directional change in a magnetic field applied to a header of a card reader by intervals of magnetic lines disposed in a magnetic strip during a swiping operation when the card is used for payment, and then delivers card information to the card reader. That is, among the magnetic lines in the magnetic strip, wide magnetic lines indicate "0" as binary data, and a combination of two magnetic lines having different polarities and shallow intervals indicates "1" as binary data. A numeric character and an alphanumeric character are formed by collecting such binary data. Since the magnetic field generator 200 of the multi-card according to an exemplary embodiment of the invention forms one direction of lines of magnetic force in one track, the magnetic field generator 200 may generate time-variant magnetic signals in a specific time interval range in which a change in a magnetic field is caused in a header when a card is read by a user actually swiping the card. Thus, a user may select a method of swiping a card or a method of inserting a card into a header portion of a card reader so that card information may be recognized. That is, the magnetic field generator 200 allows a card reader to recognize binary data of 0 and 1 by generating a variable magnetic field that changes as an electric current flow changes.

Also, the insertion detecting unit 400 may be further included. The insertion detecting unit may recognize an insertion of the card into a card reader. The insertion detecting unit may recognize the insertion of the card into a card reader in various ways. Also, when the insertion of the card into a card reader is recognized by the insertion detecting unit 400, the multi-magnetic smart card may supply power to the magnetic field generator during a specific time when a card payment is to be performed by the control unit. Thus, power loss may be reduced because power may be supplied only when the card is used. For example, the control unit may supply power to the magnetic field generator only when a card payment is performed. A method in which the insertion detecting unit recognizes an insertion of the card into a card reader will be described below.

The insertion detecting unit 400 may include a pressure sensor and may recognize an insertion of the card into a card reader. The insertion detecting unit 400 may be disposed at a specific position of a plate by which (or with which) a header of a card reader passes (or comes into contact). For example, the pressure sensor may be disposed above or below the magnetic field generator. When the card is inserted into a card reader, pressure may be applied to the pressure sensor by a header of the card reader. That is, when the header is in contact with one surface of the card reader and the multi-magnetic smart card inserted between the header and a surface of the card reader, the multi-magnetic smart card may recognize the insertion of the multi-magnetic smart card into the card reader and supply power to the magnetic cell 210.

Also, for example, when the multi-magnetic smart card is dynamically swiped, the insertion detecting unit 400 may be provided at a position adjacent to an end of the magnetic field generator. When the multi-magnetic smart card moves inside the card reader, the insertion detecting unit 400 may detect contact with the header before the magnetic field generator is recognized by the header. Thus, the power consumption may be reduced since the multi-magnetic smart card generates a magnetic signal when the multi-magnetic smart card starts to be read.

Also, the insertion detecting unit 400 may receive an electric signal caused by the exchange of a magnetic signal for card information between the header of the card reader and the magnetic field generator, and may detect an insertion of the multi-magnetic smart card into the card reader. That is, the magnetic cell 210 of the magnetic field generator may function as an inductive sensor, and detect a change in a magnetic field between the magnetic cell 210 and the header of the card reader and transmit the card information to the header of the card reader.

Also, the insertion detecting unit 400 may includes both the pressure sensor and the inductive sensor. Thus, it is possible to prevent a malfunction caused by pressure being applied to the pressure sensor through an element other than a header of a card reader, and it is also possible to prevent a malfunction caused by a change in a magnetic field of the magnetic cell 210 by an object that causes a change in the magnetic field other than a header of a card reader being detected.

Figure 8:
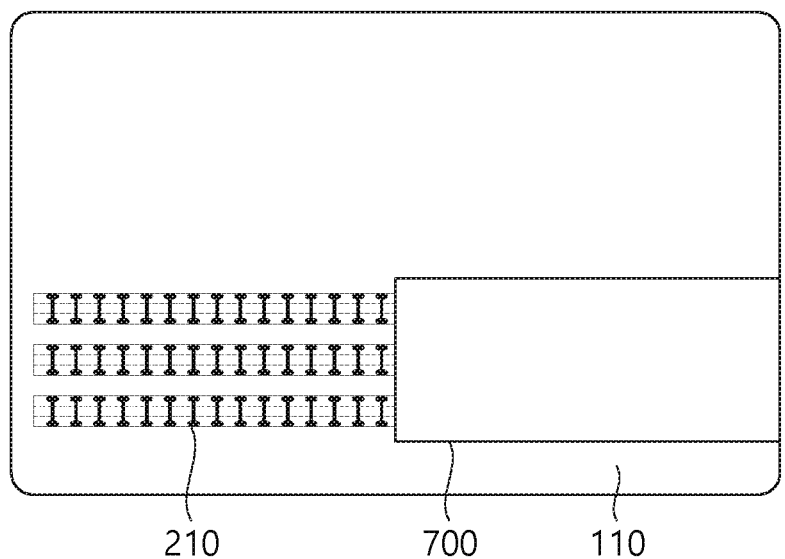
FIG. 8 is a bottom plan view of a multi-card including a magnetic field blocking layer according to an exemplary embodiment of the invention.

Also, referring to FIG. 8, the magnetic field blocking layer 700 may be further included. The magnetic field blocking layer 700 may be disposed in the output direction of the magnetic field of the magnetic cell 210 and configured to block the magnetic field from leaking to the outside. That is, since both of the poles of the magnetic cell 210 are exposed to the outside, a magnetic signal having a direction opposite to a magnetic field direction desired at a specific time may be input at a specific point. Accordingly, an area in which the magnetic signal having the opposite magnetic field direction is likely to be detected may be covered with the magnetic field blocking layer that blocks the magnetic signal from being generated to the outside over a specific range of the magnetic field generator.

Figure 9:
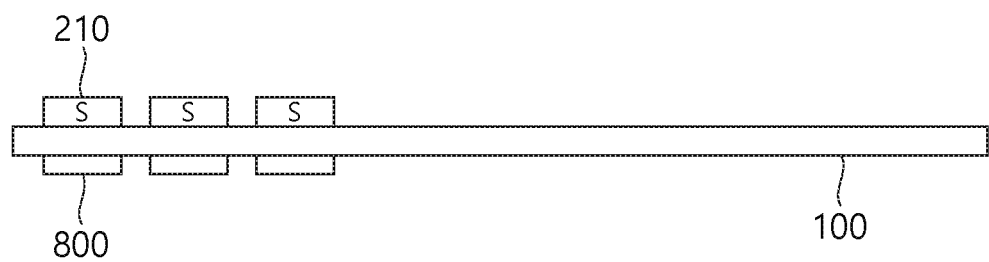
FIG. 9 is a side view of a multi-card further including a shielding layer according to an exemplary embodiment of the invention.
Figure 10:
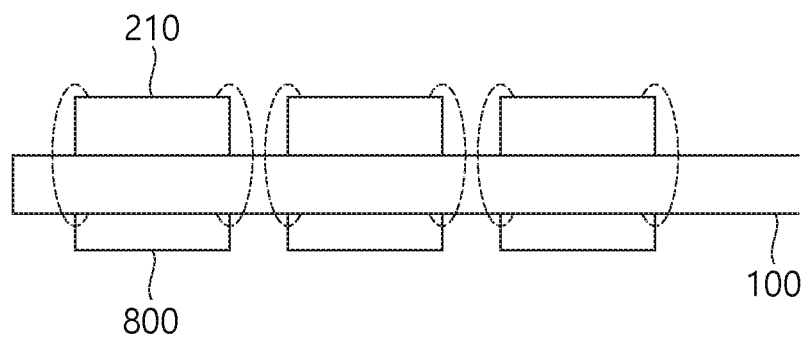
FIG. 10 is an enlarged side view of a magnetic field generator integrated with a shielding layer according to an exemplary embodiment of the invention.

Also, the shielding layer 800 may be further included. When the magnetic field generator includes a plurality of tracks, the shielding layer 800 may prevent interference between the tracks. That is, when the magnetic field generator includes the plurality of tracks, a magnetic field generated by the magnetic cell 210 of each of the tracks may generate interference in a header of a card reader corresponding to adjacent tracks thereof, thus reducing a recognition rate. Accordingly, the multi-magnetic smart card may include the shielding layer 800 at an opposite side of the output direction of the magnetic signal and may prevent interference between magnetic signals of the tracks. The shielding layer 800 may be formed of a ferromagnetic material with high permeability, and a magnetic field may change such that most lines of magnetic force pass through the shielding layer 800. Thus, as shown in FIG. 9, a magnetic field generated by the magnetic cell 210 of each track may decrease in width, thus reducing an effect on adjacent tracks.

Also, referring to FIG. 2, the information display unit 500 may be further included. The information display unit 500 may be provided at one side of a front surface of a plate and be configured to display relevant information on a screen to provide the information to the user. That is, the information display unit 500 displays information processed by the multi-card. For example, when the multi-card is inserted into a card reader to perform payment or accumulation, the information display unit 500 may display a user interface (UI) or graphic user interface (GUI) associated with the card payment or the accumulation or may display information regarding a card that is used for the payment or accumulation. In this case, the information display unit 500 may display a name of a card used, a current payment amount, an accumulated payment amount, user default information, etc. Also, when a name of a card affiliate that will perform payment is input through the information input unit 600, the information display unit 500 may also display a list of membership cards with a discount benefit for the corresponding affiliate. Also, when the information display unit 500 of the multi-card performs reward accumulation or the like itself, the information display unit 500 may also display a bar code, a number, a Quick Response (QR) code, or the like of a card that is to be used for accumulation.

As described above, when the information display unit 500 and a touch pad form a layered structure to constitute a touchscreen, the information display unit 500 may be used as an input device as well as an display device. When the information display unit 500 is configured as a touchscreen, the information display unit 500 may include a touchscreen panel, a touchscreen panel control unit, etc. When the information display unit 500 is implemented as a touchscreen, the user may select card information (e.g., a company logo, a card appearance, a card name, etc.) displayed on the information display unit 500 by using a touch input, and may change a card by touching a portion of the touchscreen where a card change key is displayed or by touching the touchscreen and then moving (e.g., swiping) along a predetermined path.

Also, when the touch input includes touching the touchscreen 500 and then swiping along a predetermined path, the multi-card may change a card classification, change a card type, select a card, unselect a card, etc., according to a touch command input to the touchscreen 500. For example, when the user swipes up and down on the touchscreen 500, a card classification may be changed. That is, the card classification may be changed to a credit card group of the user, a check card group of the user, and a point card group of the user. When the user swipes left and right on the touchscreen 500, a card type in the card classification may be changed. That is, when the card classification is the credit card group, the user may find and select a credit card to be used for payment by swiping left and right. Also, the user may select or unselect a card by touching a card image, a company logo, etc. displayed on the information display unit 500.

In addition, the information display unit 500 may include at least one of a liquid crystal display, a thin film transistor-liquid crystal display, an organic light-emitting diode, a flexible display, and electronic paper. According to exemplary embodiments of the multi-magnetic smart card, there may be two or more information display units 500. For example, the information display units 500 may be provided on both of the front surface and the rear surface of the multi-card.

Electronic paper is an electronic device that mimics the appearance of paper and may serve as paper, and is also referred to as e-paper. Various methods such as a method of achieving an ink effect using small balls or capsules and a method of achieving a paper effect by making a flat panel display such as a conventional liquid crystal display (LCD) thinner may be applied to electronic paper.

Also, a biometric information input unit may be further included. The biometric information input unit may be provided at one side of the plate and configured to acquire biometric information of the user. The control unit may compare the biometric information acquired through the biometric information input unit with prestored biometric information and may determine whether the magnetic field generator will generate card information.

For example, the multi-card may include a biometric information input unit that may acquire fingerprint information of the user. The biometric information input unit may deliver the acquired fingerprint information to the control unit, and the control unit may determine whether prestored fingerprint information of the user matches the acquired fingerprint information. When the prestored fingerprint information matches the acquired fingerprint information, the control unit may process specific card information so that the card information is consistent with a specific magnetic field generating method, and may supply an electric current to each of the magnetic cells 210 of magnetic field generator.

The biometric information input unit may also receive biometric information from an external apparatus such as an iris recognition camera that is difficult to be built into the flat plate 100. In this case, a function of the biometric information input unit may be performed by a short-range wireless communication unit for communicating with an external apparatus to be described below.

Also, referring to FIG. 2, the information input unit 600 may be further included. The information input unit 600 may be provided at one side of the plate and configured to receive an operation input from the user to select specific card information from among one or more pieces of card information stored therein. That is, the information input unit 600 is configured to receive input data for controlling the operation of the multi-card from the user and deliver the data to the control unit 300. The information input unit 600 may include a keypad, a keyboard, a dome switch, a touch pad (e.g., a capacitive/resistive type), etc., and may be exposed at the one side of the plate 100. For example, the information input unit 600 may be implemented in a button input method in which a card is changed or selected by direction buttons and a selection button, a touch pad method in which a card is changed or selected by receiving a touch operation input from the user, etc. In particular, a touch pad may refer to a touchscreen when the touch pad is formed in a layered structure together with the information display unit 600 that has been described above. When the information input unit 600 is configured as the touchscreen 500, the user may select a desired card through manipulation of the user interface displayed on the touchscreen 500. Thus, the information input unit 600 is configured to receive a manipulation from the user and perform a selection from information regarding a plurality of cards.

Also, a short-range wireless communication unit may be further included. The short-range wireless communication unit is provided in the plate and may be configured to receive new card information or receive user authentication information from an external device. Bluetooth, Bluetooth low energy (BLE), beacon, radio frequency identification (RFID), infrared data association (IrDA), ultra wideband (UWB), ZigBee, near field communication (NFC), etc. may be used as short-range communication technology used in the short-range wireless communication unit. The short-range wireless communication unit may receive new card information and deliver the received card information to the control unit 300. The control unit 300 may process the information and store the processed information in the memory.

Also, the short-range wireless communication unit may be built into the plate 100 and configured to receive biometric information of the user from the outside. For example, an iris recognition may be used to determine whether a card is used by an owner thereof, the short-range wireless communication unit may receive iris information of the user through an iris recognizer or a smartphone capable of iris recognition that interoperates with the short-range wireless communication unit and deliver the iris information to the control unit 300 in order to determine whether the iris information matches prestored user iris information. When the received iris information matches the user iris information, the control unit 300 may approve the use of the card and supply an appropriate electric current to each of the magnetic cells 210 of the magnetic field generator 200.

A magnetic cell manufacturing method according to another exemplary embodiment of the invention includes attaching a core material to a predetermined position of a first layer in which a first circuit pattern is provided at one side and attaching a second layer in which a second circuit pattern is provided at one side with a predetermined position at which the first circuit pattern will be connected to the second circuit pattern. For example, the core material 230 may be capable of double-sided adhesion, and the core material 230 may be cut to a predetermined length to be simply attached to the first or second layer 212. The first circuit pattern may be connected to the second circuit pattern so that an electric current input to the first or second circuit pattern rotationally flows in a specific rotational direction with respect to the core material 230 by the circuit patterns being connected to each other. The core material may be a mixture including a magnetic powder and an adhesive material to have adhesive strength. Thus, it is possible to simplify a process of manufacturing the magnetic cell 210 and increasing a speed of the process in comparison to a conventional method.

A magnetic cell manufacturing method according to still another exemplary embodiment of the invention includes attaching the first layer 211 in which a first circuit pattern is provided at one side thereof and the second layer 212 in which a second circuit pattern is provided at one side thereof so that the first circuit pattern is connected to the second circuit pattern and injecting a core material into an internal space formed between the first layer and the second layer. That is, the internal space 213 may be formed by attaching the first layer 211 and the second layer 212, and the magnetic cell 210 may be formed by injecting the core material into the internal space. For example, referring to FIGS. 6 and 7, at least one of the first layer 211 and the second layer 212 may have respective curved areas 214 and form the internal space by the curved areas 214 being opposed when the first layer 211 and the second layer 212 are attached. The magnetic cell 210 may be formed by injecting the core material 230 to fill the internal space. The first circuit pattern may be connected to the second circuit pattern so that an electric current input to the first or second circuit pattern rotationally flows in a specific rotational direction with respect to the core material 230 by the circuit patterns being connected to each other. The core material may be a mixture of a magnetic powder and an adhesive material to have adhesive strength.

A magnetic cell manufacturing method according to yet still another exemplary embodiment of the invention includes directly printing a core material to a predetermined position of a first layer in a specific shape, the first layer having a first circuit pattern provided at one side thereof and attaching the first layer 211 and the second layer 212 in which a second circuit pattern is provided at one side thereof so that the first circuit pattern is connected to the second circuit pattern. The core material 230 may be a mixture of a magnetic powder and an adhesive material to have adhesive strength, and may be directly printed on the first layer 211 in a specific shape. The first circuit pattern is connected to the second circuit pattern so that an electric current input to the first or second circuit pattern rotationally flows in a specific rotational direction with respect to the core material 230 by the circuit patterns being connected to each other. That is, the magnetic cell 210 may be formed by printing the core material 230 in a specific size on a surface of the first layer 211 or the second layer 212 that is to be attached with the opposite layer and attaching the opposite layer therewith. The first layer 211 or the second layer 212 may have a space on which the core material 230 is to be printed. For example, referring to FIG. 7, the first layer 211 or the second layer 212 may have a recessed printing space (or the curved area 214). The magnetic cell 210 may be formed by filling the printing space with the core material 230 and then covering the printing space with a flat opposite layer. Also, for example, when the first layer 211 or the second layer 212 are formed of a flexible material, the magnetic cell 210 including the core material 230 between the first layer 211 and the second layer 212 may be generated by bending the first layer 211 or the second layer 212 after printing the core material 230 thereon.

According to the invention, the following various effects can be obtained.

First, the multi-card according to an exemplary embodiment of the invention may improve ease of carrying cards because all data for payment and reward accumulation is stored in a single card. thus, the weight of a wallet carried by a user may be reduced by reducing the number of cards carried by the user.

Second, the multi-card according to an exemplary embodiment of the invention may implement desired card information through the magnetic field generator by directly swiping the multi-card or by inserting the multi-card. Thus, payment may be performed in an appropriate method depending on the case.

Third, the multi-card may display card information through the information display unit, thus allowing the user to check which card is selected for payment.

Fourth, the multi-card according to an exemplary embodiment of the invention may include the information input unit so that the user may readily manipulate a card. In particular, the information input unit and the information display unit may be a touchscreen, and the touchscreen provides improved convenience in that the card manipulation can be immediately performed while the display unit is being checked, and the multi-card may have reduced thickness because separate input elements such as a keypad is not necessary.

Fifth, manufacturing a magnetic cell may be simplified compared to conventional methods by attaching or injecting a core material between a first layer and a second layer, thereby providing the advantage of increasing production efficiency.

Sixth, material costs for generating a core layer can be reduced by inserting the core material into an internal space formed between the first layer and the second layer, rather than forming a separate layer for the core layer.

Seventh, the multi-card according to an exemplary embodiment of the invention may prevent or reduce interference between tracks by using the shielding layer, thus increasing a recognition rate when the card is used.

Exemplary embodiments of the invention have been described above with reference to the accompanying drawings. Those skilled in the art should understand that various changes in form and details may be made therein without departing from the spirit and scope of the invention as defined by the appended claims. The above embodiments are accordingly to be regarded as illustrative rather than restrictive.

What is claimed is:

1. A smart card comprising:
   a support; and
   a magnetic field generating unit arranged on one surface of the plate along a long side of the plate and including at least one track for generating a magnetic signal by forming a magnetic field,
   wherein the at least one track comprises a single magnetic cell in which both magnetic poles thereof are formed when an electric current flows therethrough,
   wherein the magnetic cell comprises:
   a first layer having a first circuit pattern and a first via hole;
   a second layer having a second circuit pattern and a second via hole; and
   a core material provided between the first layer and the second layer, and
   wherein the first via hole and the second via hole are matched so that the electric current rotationally flows through the circuit patterns and the via holes in a predetermined direction with respect to the core material.

2. The smart card of claim 1,
   wherein the core material is a mixture comprising:
   a magnetic powder; and
   an adhesive material to have adhesive strength.

3. The smart card of claim 2,
   wherein the magnetic cell is formed by attaching one or more pieces of the core material cut to a predetermined length to a predetermined position of the first layer and then attaching the second layer therewith.

4. The smart card of claim 2,
   wherein the magnetic cell further comprises an internal space formed between the first layer and the second layer, and
   wherein the core material is injected into the internal space.

5. The smart card of claim 2,
wherein the core material is printed on one of the first layer or the second layer in a specific shape.

6. The smart card of claim 1, further comprising:
a magnetic field blocking layer disposed in the output direction of the magnetic signal of the magnetic cell, the magnetic field blocking layer configured to block the magnetic field from leaking to the outside.

7. The smart card of claim 1, further comprising:
an insertion detecting unit configured to recognize an insertion of the smart card into a card reader.

8. The smart card of claim 7,
wherein the insertion detecting unit is disposed on the support so that it comes into contact with a header of the card reader when the smart card is inserted therein.

9. The smart card of claim 1, further comprising:
a shielding layer configured to prevent interference between the tracks when the magnetic field generator includes a plurality of tracks.

10. The smart card of claim 1, further comprising:
a processor provided in the support and configured to transmit a magnetic driving current signal corresponding to specific card information to the magnetic field generator.

11. The smart card of claim 10,
wherein the magnetic signal is time series data generated over time by controlling whether the magnetic driving current signal is supplied or by controlling a flow direction of the magnetic driving current signal.

12. The smart card of 1, wherein the support comprises a plate.

13. The smart card of 10, wherein the processor comprises a control unit.

14. A method of manufacturing a magnetic cell, the method comprising:
attaching a core material comprising a mixture of magnetic powder and adhesive material to a predetermined position of a first layer having a first circuit pattern; and
attaching a second layer having a second circuit pattern with a predetermined position at which the first circuit pattern will be connected to the second circuit pattern,
wherein the first circuit pattern is connected to the second circuit pattern, an electric current rotationally flows in a specific rotational direction with respect to the core material; and
wherein the core material is made by mixing a magnetic powder and an adhesive material to have adhesive strength.

15. A method of manufacturing a magnetic, the method comprising:
attaching a first layer having a first circuit pattern and a second layer having a second circuit pattern to connect the first circuit pattern to the second circuit pattern; and
injecting a core material comprising a mixture of magnetic powder and adhesive material into an internal space formed between the first layer and the second layer,
wherein at least one of the first layer and the second layer comprise a curved area that forms the internal space when the first layer and the second layer are attached, and
wherein the first circuit pattern is connected to the second circuit pattern so that an electric current rotationally flows in a specific rotational direction with respect to the core material.

16. The method of claim 14, wherein the attaching the core material comprises:
Printing a core material at a predetermined position of a first layer in a specific shape, the first layer having a first circuit pattern.

* * * * *